(Model.)
J. M. DECKER.
GATE.
No. 264,635. Patented Sept. 19, 1882.
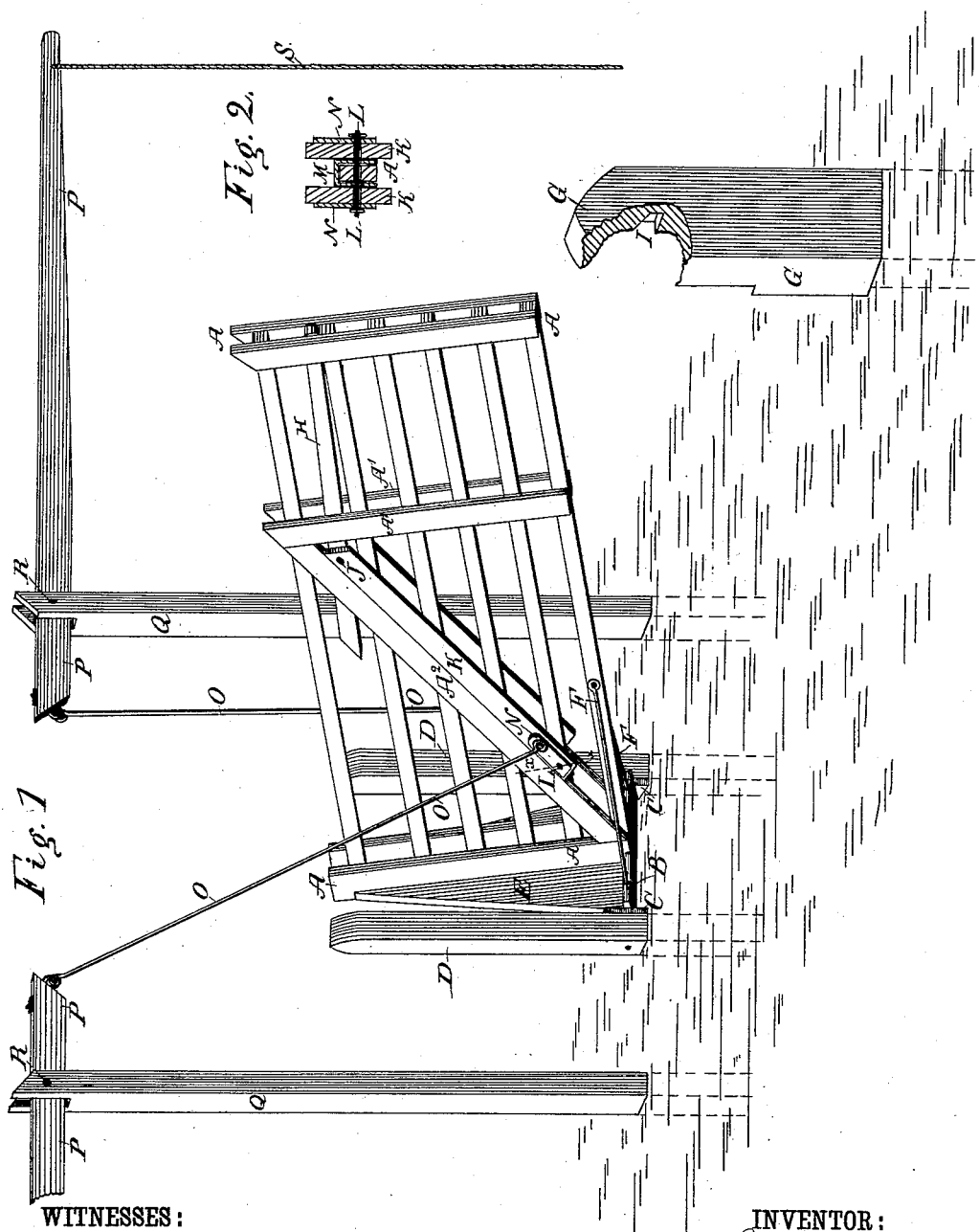

UNITED STATES PATENT OFFICE.

JOHN M. DECKER, OF KINGSTON, OHIO.

GATE.

SPECIFICATION forming part of Letters Patent No. 264,635, dated September 19, 1882.

Application filed April 20, 1882. (Model.)

*To all whom it may concern:*

Be it known that I, JOHN M. DECKER, of Kingston, in the county of Ross and State of Ohio, have invented a new and useful Improvement in Gates, of which the following is a full, clear, and exact description.

Reference is to be had to the accompanying drawings, of which Figure 1 is a perspective view of my improvement, shown as partly opened. Fig. 2 is a detailed cross-section thereof.

The object of this invention is to facilitate the opening and closing of gates, and also to increase the strength and durability of the said gates.

The nature of the invention consists in the combining, with the gate having horizontal bars, inclined brace-bars, a latch, and rods connected to the operating-levers, of inclined hinged bars, substantially as hereinafter more fully set forth.

A represents the gate, which is formed by attaching cross-bars to the opposite sides of the ends of horizontal bars. The gate A is further strengthened by cross-bars A', attached to its opposite sides at a distance from its forward end equal to about one-third its length. The gate is also strengthened by inclined braces $A^2$, attached to its opposite sides and extending from the lower ends of the rear cross-bars to the upper ends of the cross-bars A'. The rear corner of the gate A is notched to receive the roller or pivoted cross-piece B, the ends of which work in bearing-blocks C, attached to the lower parts of the gate-post D. The gate is strengthened in a vertical position by triangular braces E, the lower ends of which are attached to the roller. The braces E extend to, or nearly to, the upper ends of the rear cross-bars of the gate A, and are securely attached to the said cross-bars. The gate A is strengthened laterally by the iron brace-rods F, the rear ends of which are attached to the roller B, and their forward ends are attached to the opposite sides of the lower longitudinal bar of the said gate. With this construction the gate A is hinged at its lower rear corner, and is opened by raising its forward end and bringing the gate into a vertical position, and is closed by lowering the said gate into a horizontal position. When the gate A is closed its forward end enters a groove in the forward side of the post G, and is fastened in place by the latch H, the forward end of which enters a socket, I, in the said post G.

The latch H is placed between two longitudinal bars of the gate A, and between the front and middle cross-bars of the said gate, as shown in the drawings. The latch H, at a little distance from its rear end, is hinged by a bolt, J, to and between the upper ends of two inclined bars, K, which pass down along the opposite sides of the gate A, below the inclined braces $A^2$. The lower ends of the latch-bars K are hinged to a longitudinal bar of the gate A by a bolt, L.

The bar of the gate A to which the bars K are hinged is strengthened and prevented from being worn by a U strap or clip, M, passed around and secured to the said bar. The lower ends of the latch-bars K are strengthened by plates N, attached to them, and through which the bolt L passes, as shown in Fig. 2. With this construction the latch H is pushed forward to enter the socket I and fasten the gate A by the weight of the bars K, and is drawn back to unfasten the gate by raising the upper ends of the said bars K.

To the lower parts of the latch-bars K, a little above the hinging-bolt L, are hinged the lower ends of two rods, O, the upper ends of which are hinged to the inner ends of the levers P by eyebolts or other suitable means. The levers P are placed in slots in the upper ends of the posts Q, and are fulcrumed to the said posts by bolts R passing through them and through the slotted upper ends of the said posts Q. The posts Q are set in the ground at the opposite sides of the rear end of the gate A. The levers P extend along the side of the roadway to such a distance that their outer ends can be operated by a person in a vehicle or upon horseback without the horses or vehicle being near enough to the gate to impede its operation.

To the outer ends of the levers P are attached cords S, which hang in such positions that they can be readily reached and operated to open and close the gate. With this construction, when the gate is closed and either of the cords S is pulled upon the first effect is to raise the latch-bars K against the under side of the inclined braces A² and withdraw the latch H from the socket I of the post G, and the next effect is to raise the forward end of the gate A and bring the said gate into a vertical position. The gate A is closed in the same manner. In opening and closing the gate the upward movement of the rods O carries the gate into such a position that the center of gravity will be over the roller B, and the gate is then carried into position by its momentum.

Having thus described my invention, I claim as new and desire to secure by Letters Patent—

The combination, with the horizontal bars of the gate A, the inclined brace-bars A², the latch H, and the rods O, attached to the operating-levers P, of the inclined hinged bars K, substantially as herein shown and described, whereby the gate will be unfastened and opened by the same movement, as set forth.

JOHN M. DECKER.

Witnesses:
H. L. MYERS,
GEO. B. PENN.